United States Patent [19]
Rudd

[11] Patent Number: 5,571,437
[45] Date of Patent: Nov. 5, 1996

[54] INDUCTION WELDING OF TUBING WITH MULTIPLE INDUCTION COILS

[75] Inventor: Wallace C. Rudd, New Canaan, Conn.

[73] Assignee: Thermatool Corp., Conn.

[21] Appl. No.: 464,299

[22] Filed: Jun. 5, 1995

[51] Int. Cl.⁶ .................... H05B 6/40; B23K 11/08
[52] U.S. Cl. .................... 219/607; 219/612; 219/617; 219/656; 219/675
[58] Field of Search .................... 219/607, 617, 219/612, 613, 614, 608, 610, 611, 656, 675

[56] References Cited

U.S. PATENT DOCUMENTS

| | | | |
|---|---|---|---|
| 2,654,019 | 9/1953 | Body | 219/607 |
| 3,631,524 | 12/1971 | Denner | 219/612 |
| 3,701,871 | 10/1972 | Schafer | 219/614 |
| 4,197,441 | 4/1980 | Rudd | 219/612 |
| 4,418,258 | 11/1983 | McNealy et al. | 219/643 |

*Primary Examiner*—Philip H. Leung
*Attorney, Agent, or Firm*—Brooks Haidt Haffner & Delahunty

[57] ABSTRACT

A method and apparatus in which edge portions of metal parts, the edge portions being disposed with opposed surfaces, are heated by high frequency electrical currents as the edge portions are advanced and brought together at a weld point. The electrical currents are induced in the edge portions in advance of the weld point by two induction coils, one at one side of the metal parts and the other at the other side of the metal parts, disposed and energized from a high frequency electrical source so that the electrical currents at the opposed surfaces flow in opposite directions at any given time and the currents induced by one coil add to the currents induced by the other coil.

28 Claims, 9 Drawing Sheets

INDUCTION WELDING OF TUBING WITH MULTIPLE INDUCTION COILS

FIELD OF THE INVENTION

This invention relates to the welding together of facing edge portions of a pair of metal strips, of a single metal strip or sheet which is folded into a tube as the tube and sheet are advanced or of a metal strip to a tube using induction coils for causing high frequency electrical heating current, e.g. 100 kHz or higher, to flow at the edge faces.

BACKGROUND OF THE INVENTION

The welding together of facing edge portions of metal strips or sheets using an induction coil supplied with high frequency current, e.g. at 10 kHz and up to 450 kHz, for taking advantage of skin effect, to induce current in the strips or sheets which flows in opposite directions at the faces of the edge portions, for taking advantage of "proximity effect", is well known in the art. See, for example, U.S. Pat. Nos. 2,763,756; 3,037,105; 4,197,441 and 4,845,326. The practice has been to use a single induction coil in various relations to the parts to be welded together. For example, in the welding of strip folded around an axis to form a tube, the induction coil has encircled the axis either outside or inside the tube. Since the induced current must flow in a closed path, the current flowing along the edge faces which are being brought together is useful, but since the current must also flow along the inner or outer peripheral surfaces of the tube to complete the path, heating, which is not useful, also occurs at such surfaces.

In an attempt to reduce such non-useful losses, induction coils which are located at only one side of the surfaces of the metal part or parts, sometimes known as a "pancake" or "split induction" coils have been developed. However, with such coils, it is difficult to obtain the desired coupling between the parts and the coils and in addition, the impedance of such coils is relatively high which causes current load matching problems and difficulty in providing sufficient power to a coil for producing rapid heating of the edge faces.

The latter problems have assumed more importance because vacuum tube power sources, which can feed loads of high impedance, are being replaced by solid state power sources which require a relatively low impedance load.

There are difficulties and additional expense in adding a second induction coil to a system using a single induction coil. Aside from the additional cost of adding a second induction coil, there is the problem of providing connections to the second coil, which must permit the parts to be fed between two coils and when one coil is to be within a tube, there are support problems, current supply and size change problems. Even if those skilled in the art may have considered the addition of a second induction coil, which is not admitted, they would have believed that each coil would be required to supply part of the power required when a single coil is involved and that the problems encountered when a second coil is used would not be worth the effort.

Surprisingly, I have found that even though there are the mechanical problems, such as support, current supply and size change, the electrical efficiency or economy in energy use, when two coils are used, are so great that the mechanical problems can be tolerated. Furthermore, the use of two induction coils can substantially reduce the load impedance so that the two induction coils can be fed by power sources requiring low impedance loads, such as a solid state power source.

Thus, I have found that the efficiency of induction welding can be substantially increased with a pair of induction coils disposed as described hereinafter.

Tests which have been conducted have provided the following results:

| System | Power | Efficiency |
| --- | --- | --- |
| Contact current supply | 22 Kw | 100% |
| Outside coil around tube as in U.S. Pat. No. 3,037,105 | 48 Kw | 46% |
| Inside coil around tube axis | 50 Kw | 44% |
| Both foregoing coils parallel fed | 33 Kw | 66% |
| Split induction coil outside tube as in FIG. 32 of U.S. Pat. No. 4,197,441 | 44.5 Kw | 49% |
| Split induction coil inside tube under "V" | 36 Kw | 61% |
| Both split induction coils parallel fed | 29 Kw | 76% |

The tests were conducted in connection with a stationary twelve inch diameter steel pipe having a wall thickness of one-quarter inch and a power source supplying electrical energy at a frequency of about 200 kHz. The edge faces of the folded metal strip were brought together at a weld point and were spaced apart for six inches in advance of the weld point to provide a "V" in advance of the weld point. The contact current supply system, which was similar to the system shown in U.S. Pat. No. 2,818,489, was assumed, for comparison purposes, to have an efficiency of 100% since electrical energy absorbed other than at the edge faces to be welded is minimal and the amount of power required to raise the temperature at the weld point to 600° F. in 1.0 seconds was measured. Impeders, members of magnetic material, e.g. ferrite, were placed under the "V" during each of the tests.

From the foregoing table, it will be apparent that the use of induction coils is not as efficient electrically as a contact system, but of course, induction coils, even though they have electrical disadvantages, do have other advantages for some purposes.

From the comparison of the data for a single coil coaxial with the tube axis, either inside or outside the tube, it would be expected that if the power were equally supplied by two coaxial induction coils, the power requirement would be 49 Kw (98/2 Kw). However, unexpectedly, to obtain the same results with two coaxial induction coils, rather than one, only 33 Kw of power were required providing an electrical efficiency improvement of 22%.

Similarly, with a single split induction or "pancake" coil, it would be expected that if the power were equally supplied by the two coils, the power requirement would be 40.25 Kw (80.5/2 ). Again, unexpectedly with two such coils only 29 Kw of power were required providing an electrical efficiency improvement of 27% with respect to a single split induction coil outside the tube and an efficiency improvement of 15% with respect to a single split induction coil inside the tube.

BRIEF SUMMARY OF THE INVENTION

The invention provides a method and apparatus for increasing the electrical efficiency of induction welding systems in which the metal parts having facing portions to be welded together are subjected to the fields of at least two induction coils, each of one or more turns, which are disposed one at one side of the parts and the other at the opposite side of the parts and which are fed by a high frequency electrical power source or sources with a current frequency of at least 100 kHz. The induction coils may take various configurations, e.g. both can encircle the axis of a tube being welded, both can be pancake or split induction coils, or there can be combinations of these configurations depending upon the shapes of the parts being welded together. Thus, there can be only two induction coils or more than two induction coils, e.g. three or four coils, and the external and internal coils need not be the same. The induced currents add together at the facing portions to be welded together but follow separate paths outside such facing portions thereby increasing the heat ($I^2R$) at the facing portions but reducing the resistance in the separate paths where heating is not needed.

The methods and apparatus of the invention can be used not only for welding together the edge faces of a metal strip folded around its longitudinal axis to form a pipe or tube or of a pair of substantially flat metal strips, sheets or plates but also for welding together the facing portions of a folded metal strip which overlap, the facing portions of a pair of substantially flat metal strips, sheets or plates which are overlapped adjacent their edges, the facing portions of a metal strip or fin and a metal tube, strip, sheet or plate, and the facing portions of lips on a folded metal strip or on a pair of substantially flat metal strips, sheets or plates. In the case of separate metal pieces being welded together, the metal of one piece can be different from the metal of the other piece or one piece can have a thickness different from the other piece so that there are different heating requirements.

One object of the invention is to improve the electrical efficiency of the welding together of metal portions using electrical currents of high frequency, i.e. at least 100 kHz and preferably, at least 200 kHz, for heating such portions to welding temperature by the time that they are pressed together.

BRIEF DESCRIPTION OF THE DRAWINGS

Other objects and advantages of the invention will be apparent from the following description of preferred embodiments of the invention which description should be considered in connection with the accompanying drawings in which.

In the following description of the invention, it will be assumed that the person of ordinary skill in the art is familiar with prior art high frequency, electrical welding systems which include devices, such as scarfing tools, advancing and pressing rolls, support mandrels, impeders, etc., and such devices will not be illustrated in all embodiments described hereinafter. Furthermore, such person will be aware of skin effect and proximity effect and will know how high frequency current is generated and supplied to induction coils. Also, such person will be aware that during initial feed of the metal stock, it is necessary to separate certain components, such as the induction coils to permit initial feeding of the stock, whereas after the initial feeding, the components can be brought nearer the stock. Also, during welding, there is smoke, spume and dirt at the welding area and in advance of the weld point and because of the large currents involved, any contacts used must be kept clean.

As previously mentioned, the plural induction coil system is applicable for high frequency electrical welding systems where single induction coils were previously used and provides significant and unexpected electrical efficiency advantages. Thus, the plurality of induction coils may be two or more pancake coils, two or more coils encircling the axis of a tube or one or more combinations of such coils. The coils may be connected to the energy source either in electrical parallel or electrical series, preferably, the former for solid state electrical current generators to lower the coil impedance. As is conventional, the leads, coils and contacts are cooled, such as by making the leads and coils of copper tubes and circulating cooling water through channels at the contacts. In some cases, cooling fluid can be sprayed on the parts to be cooled.

Because the impedance of a coil and skin effect are dependent upon the frequency of the current supplied thereto and the coils are relatively small, the current frequency must be relatively high, i.e. at least 100 KHz and preferably, at least 200 KHz. Since the depth of current flow in a face portion of a part should be kept small for best efficiency, both skin effect and proximity effect should be kept high, and the concentration and magnitude of flow of current away from the face portion, where it is not useful, should be kept as low as possible.

Figure 1:
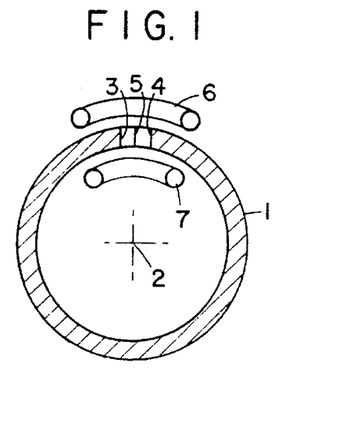
FIG. 1 is a schematic, cross-sectional view illustrating a metal sheet folded into the shape of a tube as the sheet is advanced and being heated at its edge faces by currents induced therein by a pair of pancake coils, one coil inside the tube and one coil outside the tube.

FIG. 1 illustrates schematically a first embodiment of the invention in which a sheet of metal is formed into a tube 1 as it is advanced in the direction of the tube 1 axis 2, with the edge faces 3 and 4 spaced apart in advance of the weld point 5 where the edge faces 3 and 4 have been heated to forge welding temperature due to electrical current flowing along the edge faces 3 and 4, the current on one edge face flowing oppositely to the current on the other edge face at any given time and thereby causing proximity effect. Two pancake coils 6 and 7, the coil 6 being outside, but in close proximity to, the tube 1, and the other coil 7 being inside, but in close proximity to, the tube 1, are connected to a source, of high frequency current and induce electrical currents in the tube 1 which flow at the edge faces 3 and 4 and along the surfaces of the tube 1 in paths spaced circumferentially from the edge faces 3 and 4.

Figure 2:
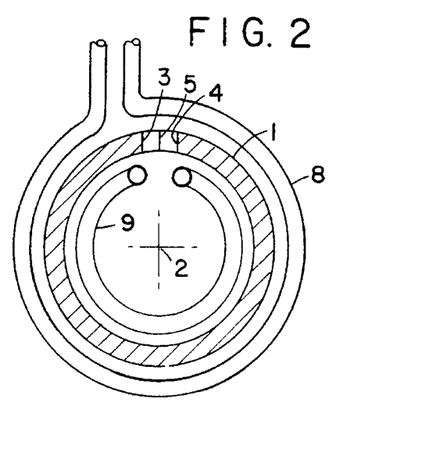
FIG. 2 is similar to FIG. 1 but illustrates heating of the edge faces by a pair of coils encircling the axis of the tube, one coil inside the tube and one coil outside the tube.

FIG. 2 illustrates schematically a second embodiment of the invention in which a first coil 8 encircles the advancing tube 1 and a second coil 9 is within the tube 1 and encircles the axis of the tube 1. Both coils 8 and 9 are fed with high frequency current from a source or sources of such current, and as in the embodiment shown in FIG. 1, the current flows in opposite directions on the edge faces 3 and 4 in advance of the weld point 5 and flows in paths along the exterior and interior peripheries of the tube 1 adjacent to the coils 8 and 9.

Figure 3:
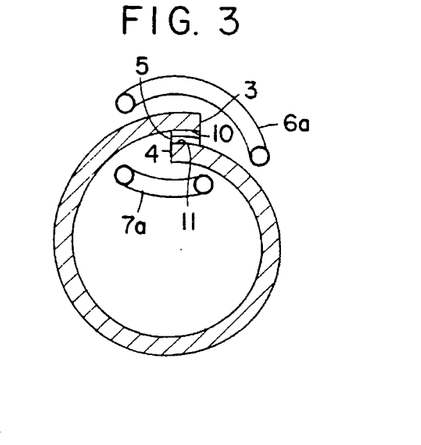
FIG. 3 is a schematic, cross-sectional view illustrating a metal sheet folded into the shape of a tube with portions of the sheet at its edges overlapping as the sheet is advanced, the adjacent faces of such portions being heated by currents induced therein by a pair of pancake coils, one coil inside the tube and one coil outside the tube.

FIG. 3 illustrates an embodiment similar to FIG. 1 but in which the edge faces 3 and 4 are not opposing. Instead, portions 10 and 11 of the metal sheet forming the advancing tube 1a overlap and are adjacent to each other. Current is induced in such portions 10 and 11 by the pancake coils 6a and 7a and flows in opposite directions thereat. The current also flows along paths at the inner and outer surfaces of the tube 1a spaced circumferentially from the portions 10 and 11.

Figure 4:
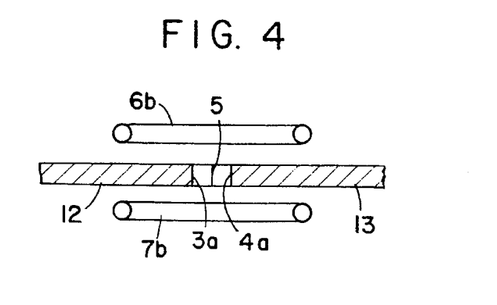
FIG. 4 is a schematic, cross-sectional view illustrating a pair of metal sheets being brought together at their edge faces as they are advanced, the edge faces being heated by currents induced therein by a pair of pancake coils, one coil at one side of the sheets and the other coil at the other side of the sheets.

FIG. 4 is similar to FIG. 1 in that edge faces 3a and 4a of a pair of advancing metal sheets 12 and 13 are heated to forge welding temperature by the time they reach the weld point 5 by currents induced therein by the pancake coils 6b and 7b, the coil 6b being at one side of the metal sheets 12 and 13 and the coil 7b being at the other side of the metal sheets 12 and 13.

Figure 5:
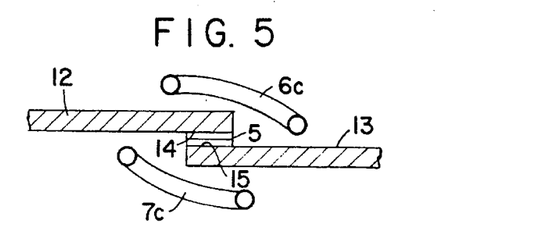
FIG. 5 is similar to FIG. 4 with the exception that portions of the sheets are overlapped and such portions are heated by the currents induced therein by the pancake coils.

FIG. 5 is similar to FIG. 3 in that overlapped portions 14 and 15 of a pair of metal sheets 12 and 13 are heated to forge welding temperature by the time that they are advanced to the weld point 5 by currents induced therein by the pancake coils 6c and 7c disposed as described in connection with FIG. 4.

Figure 6:
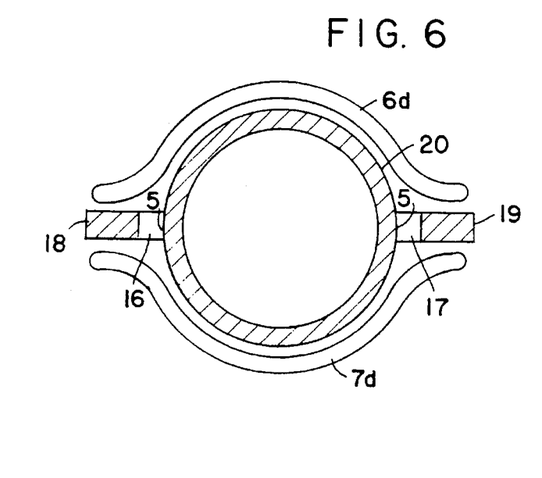
FIG. 6 is a schematic, cross-sectional view illustrating the welding of a pair of metal strips to a metal tube as the strips and tube are advanced, the faces of the strips adjacent to the tube and the portions of the tube adjacent such faces being heated by the currents induced therein by a pair of pancake coils, one coil at one side of the strips and the other coil at the other side of the strips.

FIG. 6 illustrates the use of a pair of pancake coils 6d and 7d to induce currents in the edge faces 16 and 17 of a pair of strips 18 and being welded to a tube 20 as the strips 18 and 19 and the tube 20 are advanced so that they meet at weld points 5. Because of the proximity effect, the currents also flow along the portions of the tube 20 nearest the edge faces 16 and 17 so that both said edge faces 16 and 17 and such portions of the tube 20 reach forge welding temperature by the time that they reach the weld points 5.

Figure 7:
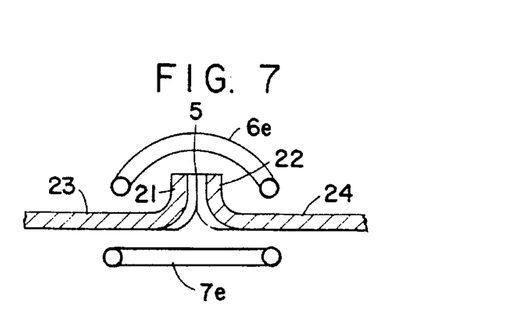
FIG. 7 is a schematic, cross-sectional view illustrating the welding of a pair of up-turned edge portions of either a pair of metal sheets or a folded single metal sheet as the sheets or sheet are advanced, the edge portions being heated by the currents induced therein by a pair of pancake coils, one coil at one side of the sheets or sheet and the other coil at the other side of the sheets or sheet.

As illustrated in FIG. 7, the invention can also be used to weld together the upturned edge portions 21 and 22 of a pair of metal sheets 23 and 24. Of course, FIG. 7 also illustrates the welding together of the upturned edge portions of a single metal sheet forming a tube as illustrated in FIG. 1. Oppositely flowing currents are induced in the adjacent faces of the upturned portions 21 and 22, as they are advanced to the weld point 5, by the pancake coils 6e and 7e.

Figures 8, 16, 17:
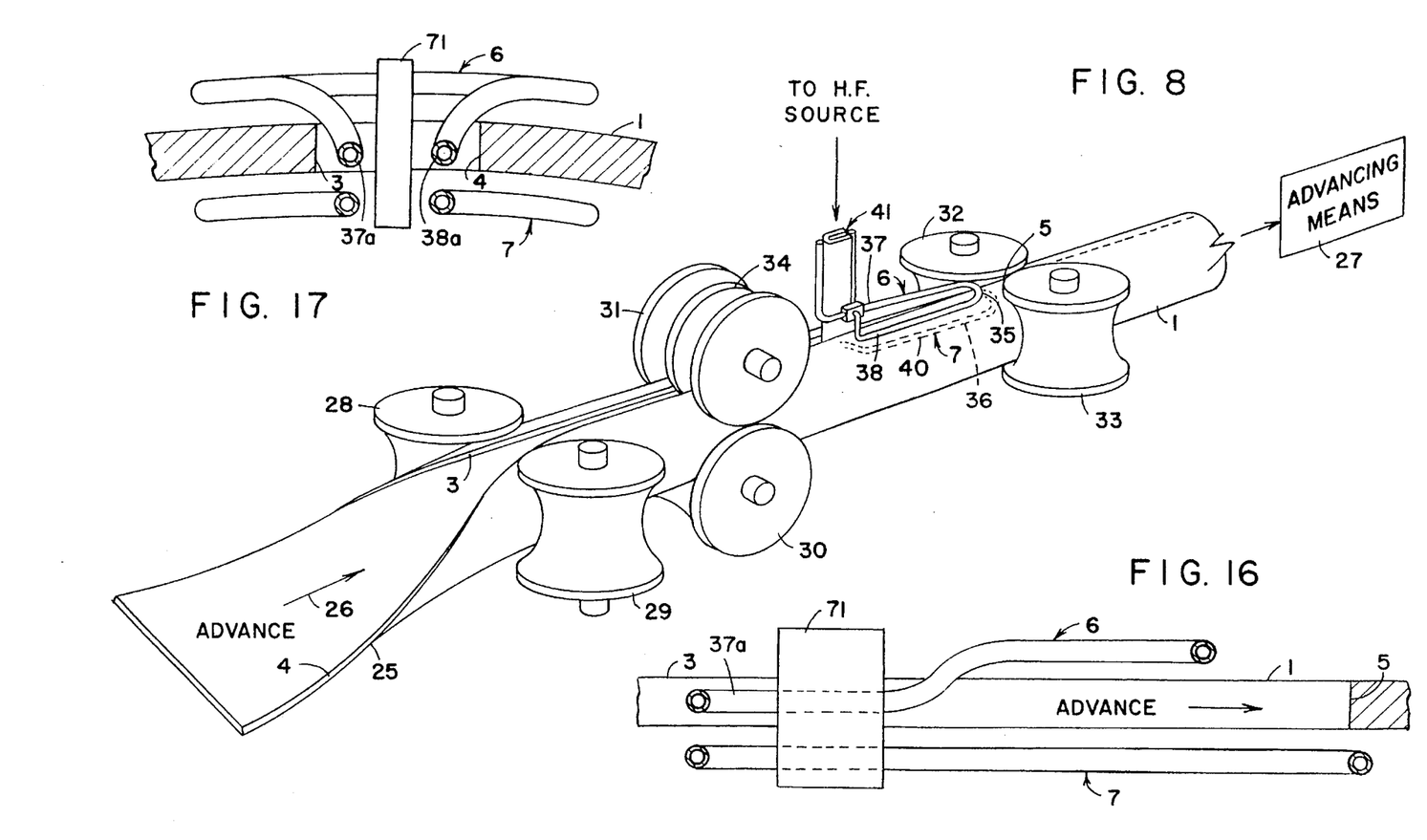
FIG. 8 is a schematic, perspective view, partly broken away, of a portion of apparatus which can be used to carry out welding of a tube with a pair of pancake coils as illustrated schematically in FIG. 1.
FIGS. 16 and 17 are, respectively, schematic, side elevation and end elevation views, partly in section, illustrating modifications of the pancake coils.
Figures 9, 15:
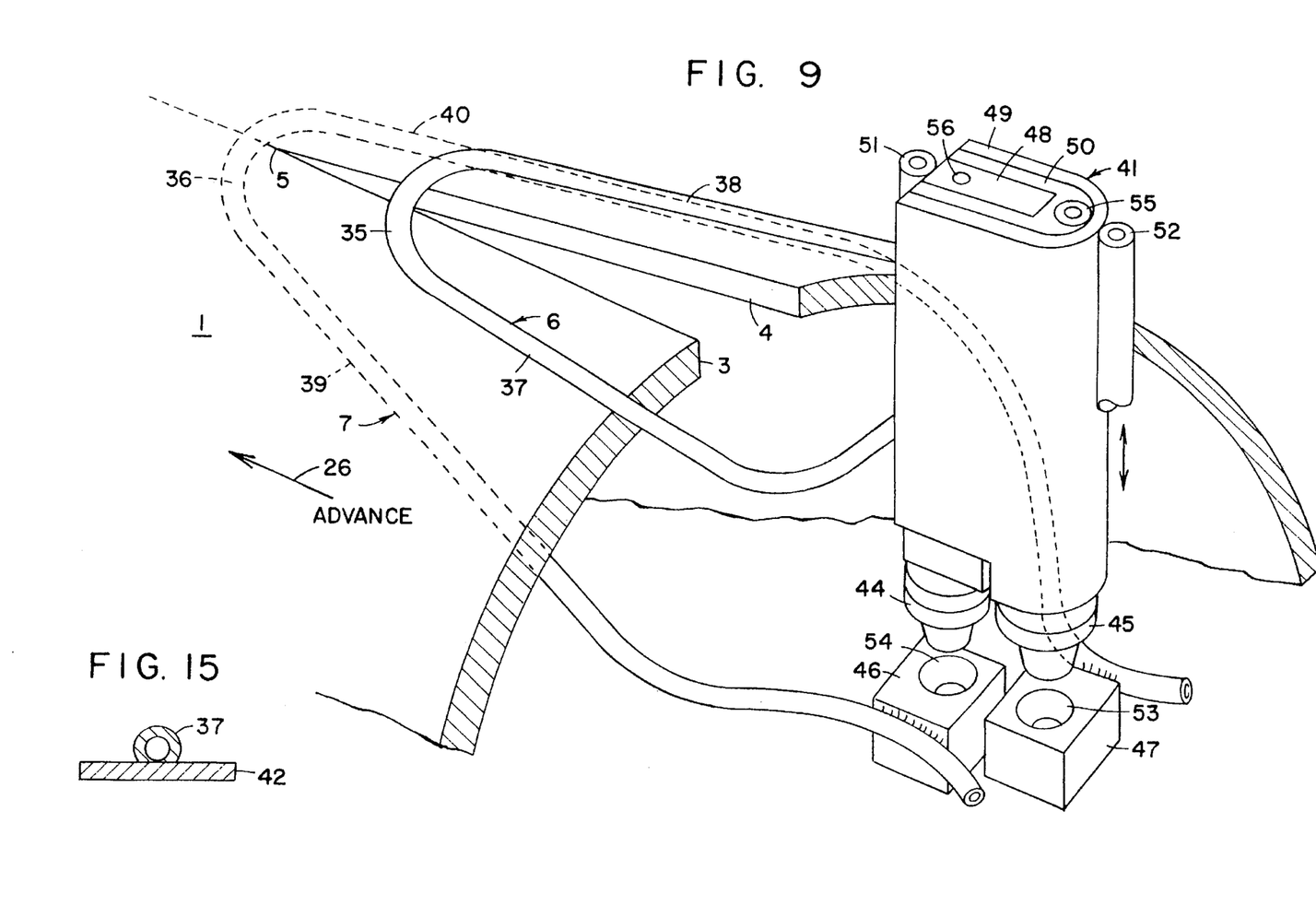
FIG. 9 is a schematic, enlarged perspective view of a portion of the apparatus shown in FIG. 8, the view in FIG. 9 being reversed with respect to FIG. 8.
FIG. 15 is a cross-sectional view of a modification of a portion of a pancake coil which can be used.

FIGS. 8 and 9 illustrate schematically a practical embodiment of the invention illustrated in FIG. 1, other apparatus conventional in a tube forming mill being omitted. Thus, a metal sheet or strip 25 is advanced in the direction of the arrow 26 by conventional advancing or pulling means 27 and is formed into a tube 1 by forming rolls 28, 29, 30 and 31 and pressure rolls 32 and 33. In advance of the weld point 5, where the edge faces 3 and 4 have reached forge welding temperature and are pressed together by the pressure rolls 32 and 33, the edge faces 3 and 4 are held apart by a fin 34. Thus, when viewed in plan, the edge faces 3 and 4 form a "V" extending from the fin 34 to the weld point 5 with the apex of the "V" at the weld point 5.

Between the roll 31 and the weld point 5, there are a pair of elongated pancake coils 6 and 7, each with a nose 35 or 36 connecting sides 37, 38, 39 and 40, connected to a high frequency current source by leads 41. Due to the presence of the pressure rolls 32 and 33, the nose 35 is upstream of the weld point 5, but the nose 36 can be downstream of the weld point 5. The sides 37 and 38 and the sides 39 and 40 are spaced from the edge faces 3 and 4 in the direction circumferentially of the tube 1 by distances which are small relative to the circumference of the tube 1. See, for example, U.S. Pat. No. 4,197,441.

When the coils 6 and 7 are electrically energized, the coil 6 causes current flows at the edge faces 3 and 4 which flow in opposite directions and at the exterior surface of the tube 1 under the sides 37 and 38, and the coil 7 causes current flow at the edge faces 3 and 4 which flow in opposite directions and at the interior surface of the tube 1 above the sides 39 and 40. However, at any given time, the currents caused at the edge faces 3 and 4 by the coil 6 flow in the same direction as the currents at the edge faces caused by the coil 7. In other words, the currents, at the edge faces 3 and 4 caused by the coils 6 and 7, add. Since heating of the metal at the edge faces 3 and 4 is determined by the formula $W=I^2R$, doubling of the current causes four times the heating.

Of course, the current at the edge faces 3 and 4 flows to and from the weld point 5 and because of the proximity effect and the fact that the edge faces 3 and 4 become closer together as they approach the weld point 5, the current at the edge faces 3 and 4 as compared to the current spaced inwardly of the edge faces 3 and 4, and hence, the heating, increases. Also, with pancake coils 6 and 7, there is only a minor amount of current circumferentially of the tube 1.

Since current induced in a part by an induction coil must flow in a continuous or closed path, the induced current flows in the tube 1 in return paths under the sides or legs 37 and 38 and above the sides or legs 39 and 40 which produce heating of the metal of the tube 1 which contributes little to the heating of the edge faces 3 and 4. In order to reduce the concentration of the heating and resistance of non-useful current paths under the sides 37 and 38 and above the sides 39 and 40, the sides 37–40 can be widened such as by being provided with conductive plates or strips conductively connected thereto, such as the plate 42 shown in FIG. 15 connected to the side 37. Such plates terminate short of the noses 35 and 36 and extend substantially to the points of connection of the sides 37–40 to the leads 41. The plates are intermediate the sides 37–40 and the tube 1. Further embodiments of induction coils for reducing the return path resistance will be described hereinafter.

Reverting now to FIG. 9, it was previously mentioned that for the purpose of initially threading the strip 25 into the rolls 28–33, it normally is necessary to raise the coil 6 and the leads 41, the coil 7 being supported by a conventional mandrel 43 (see FIGS. 10–12) within the tube 1. Because of this, it is necessary that separable contacts be used to electrically connect the leads 41 to the coil 7.

Figure 10:
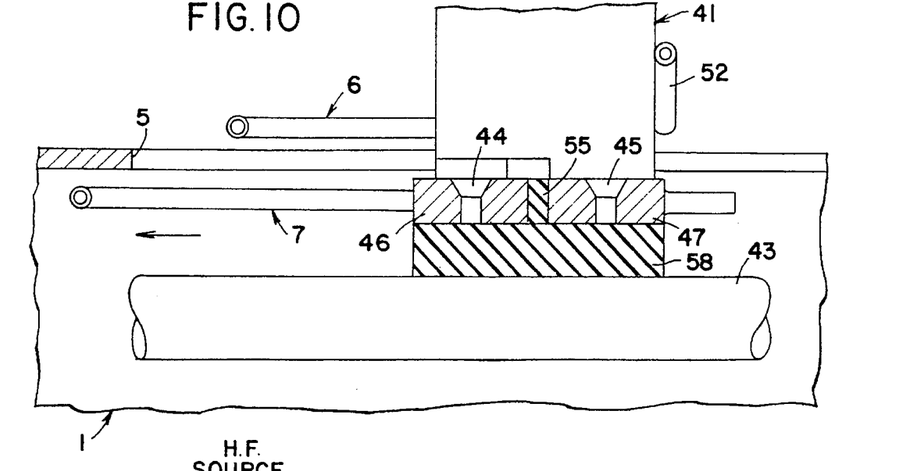
FIG. 10 is a schematic, enlarged, side elevation view, partly in section, of a portion of the apparatus shown in FIG. 8.

One embodiment of such contacts is illustrated in FIGS. 9 and 10, the upper contacts 44 and 45 being shown partially raised in FIG. 9 and the upper contacts 44 and 45 engaging the lower contacts 46 and 47 in FIG. 10. The coil 7 is connected at its ends to the lower contacts 46 and 47, and the coil 6 is connected at its ends to the center conductor 48 and the outer conductor 49 of the leads 41. The outer conductor 48 is electrically insulated from the outer conductor 49 by insulation 50. A cooling fluid, such as water, is supplied through the tubes 51 and 52 which conductively engage, respectively, the center conductor 48 and the outer conductor 49 and provide the cooling fluid to the coil 6.

The lower ends of the contacts 44 and 45 are received in apertures 53 and 54 which are open at their bottoms to permit the passage of a dirt flushing fluid, such as soluble oil, through the apertures 53 and 54 in the manner described hereinafter. However, flushing of dirt from the contacts 46 and 47 without passage of the flushing fluid through the apertures 53 and 54 may, in some cases, be sufficient. The contacts 44 and 45 also have hollow bores, and the flushing fluid is supplied thereto, and hence to the apertures 53 and 54 when the contacts 44 and 45 are raised, through a tube 55 and a channel 56 in the center conductor 48. The contacts 44–47 preferably are made of copper.

FIG. 10 illustrates mounting of the lower contacts 46 and 47 on the mandrel 43 and in association with other parts shown in FIG. 9. The contacts 46 and 47 are separated by electrical insulation 57 and are secured, in any conventional manner, to a block of insulation 58 secured to the mandrel 43 in any conventional manner. Preferably, the insulation 58 is high temperature insulation, such as TEFLON.

Figures 11, 12, 18:
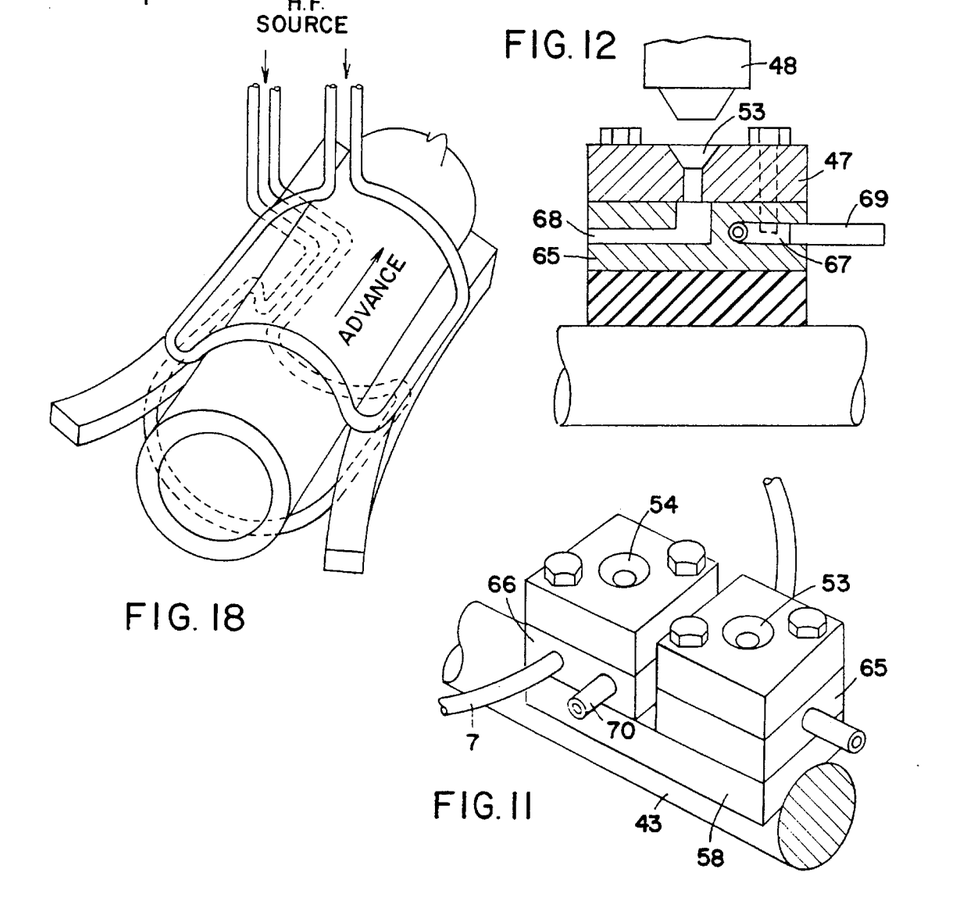
FIG. 11 is a schematic, perspective view illustrating a modification of the contact apparatus shown in FIGS. 9 and 10.
FIG. 12 is a schematic, side elevation view, partly in section, illustrating the contacts of FIG. 11 for supplying current to an inner coil.
FIG. 18 is a schematic, perspective view illustrating the welding of strips to a tube as illustrated schematically in FIG. 6.

FIGS. 11 and 12 illustrate modifications of the contact system illustrated in FIGS. 9 and 10. Metal blocks 65 and 66, preferably made of copper, each having fluid passageways, such as the passageways 67 and 68, are provided between the contacts 47 and 46 and the block of insulation 58. The passageway 68 provides an outlet for the flushing fluid supplied to the aperture 53, and the passageway 67 permits cooling fluid to be supplied to the contacts and to the coil 7 by way of a tube 69. A passageway in the block 66 corresponding to the passageway 68 similarly provides an outlet for the flushing fluid supplied to the aperture 54, and a passageway in the block 66 corresponding to the passageway 67 similarly permits cooling fluid to return from the coil 7 and to exit from the block 66 by way of the tube 70.

Figure 13:
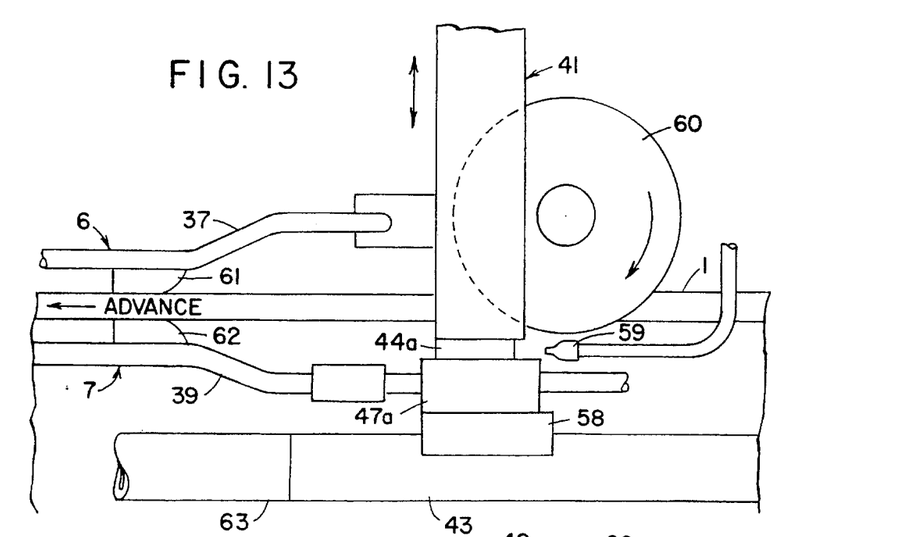
FIG. 13 is similar to FIG. 10 with modifications.
Figures 14, 24:
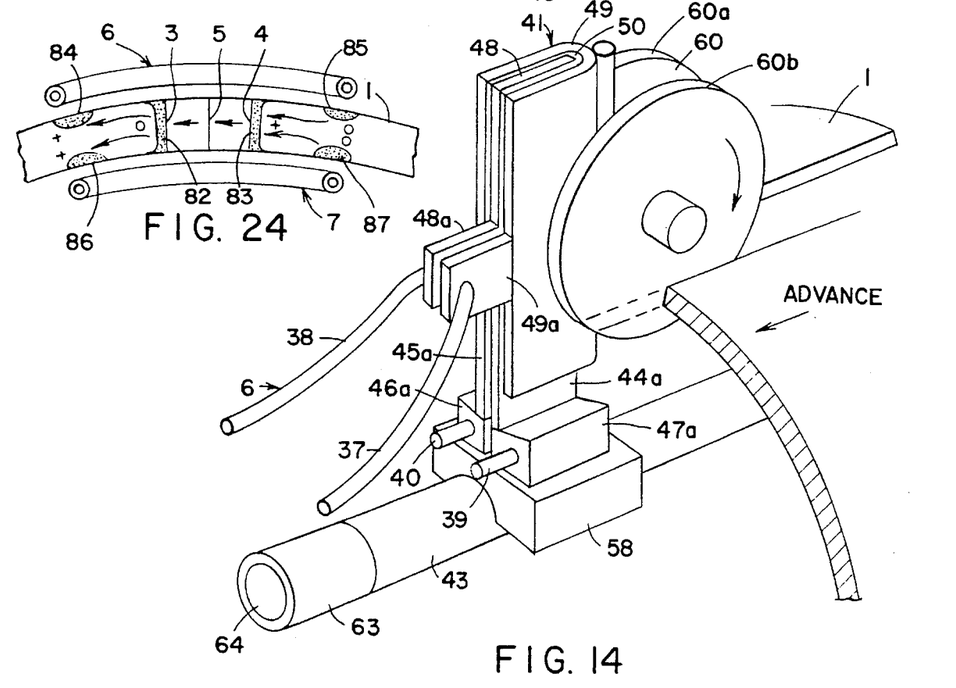
FIG. 14 is a schematic, perspective view of the apparatus shown in FIG. 13.
FIGS. 23 and 24 are schematic end elevation views used for discussion of the theory of the invention.

FIGS. 13 and 14 illustrate, schematically, modifications of the apparatus shown in FIGS. 8–10. For ease in illustration, only part of the inner coil 7 is shown in FIG. 14. It is possible to flush out dirt from between the contacts when the upper contacts are raised without having upper contacts 44 and 45 and lower contacts 46 and 47 configured as shown in FIGS. 9 and 10. Thus, when the upper contacts 44a and 45a are raised, a nozzle 59, which is located adjacent the contacts 44a and 45a and the contacts 46a and 47a can be used to spray a flushing fluid, e.g. water or soluble oil, between the contacts. In this case, the upper contacts 44a and 45a can be extensions of the outer conductor 49 and the inner conductor 48 and the lower contacts 46a and 47a can be copper blocks. The ends of the coil 7 are conductively secured to the contacts 46a and 47a, and the ends of the coil 6 are conductively secured to tabs 48a and 49a which extend from the center conductor 48 and from the outer conductor 49.

In order to ensure that the edge faces 3 and 4 of the tube do not contact the outer conductor 49, a spacer roll 60 having rims 60a and 60b insulated from each other by electrical insulating material, e.g. an insulating washer therebetween and a shaft 60c of electrical insulating material, can be provided as shown in FIGS. 13 and 14.

To prevent contact of the coils 6 and 7 with the tube 1, the sides of the coils 6 and 7 can be provided with shoes, such as the shoes 61 and 62 on the sides 37 and 39 shown in FIG. 13, made of high temperature electrical insulating material, e.g. silicon nitride, which engage the surfaces of the tube 1.

For purposes of controlling the field of the coil 7, and hence, current distribution in the edge faces 3 and 4, the mandrel 43 can be provided with a high conductivity cladding 63, e.g. a copper cladding, in which event, the mandrel 43 should have a bore 64 for the supply of cooling fluid to the clad area to reduce heating of the mandrel 43.

Although not preferred, electrical current can also be supplied to the coil 7 without contacts by coupling the coil 7 to the coil 6 substantially in advance of the weld point 5 as illustrated in FIGS. 16 and 17. Thus, the coil 7 would be a closed, elongated, electrically continuous loop and current would be induced therein by the portions 37a and 38a of the upper loop 6 which extend into the gap between the edge faces 3 and 4 and into close proximity to the coil 7. While the ends of the coil 6 would be connected to the leads 41, no connections of the coil 7 to the leads 41 would be necessary.

Coupling between the portions 37a and 38a of the coil 6 and the coil 7 can be increased by inserting a core 71 of magnetic material, e.g. a ferrite core, as shown in FIGS. 16 and 17.

FIG. 18 illustrates in perspective the embodiment of the invention, also shown in FIG. 6, in which metal fins 18 and 19 are welded to a metal tube 20 as the tube 20 and the fins 18 and 19 are advanced and the edge faces 16 and 17 and the portions of the tube 20 nearest to the edge faces 16 and 17 are heated by electrical currents induced therein by the pancake induction coils 6d and 7d.

In the embodiments described hereinbefore, the edge faces 3 and 4 or 16 and 17 and the facing portions of upturned portions 20 and 21 have been heated to welding temperature by pancake coils which are preferred in the case of the welding of a tube from a folded sheet because it is not necessary that pancake coils have a size close to the size of the tube which, in some cases, can be relatively large. Such pancake coils can be used alone, as described hereinbefore, or can be combined with other induction coils, one of which encircles the tube and the other of which is within the tube and closely follows the inner surface of the tube. However, such other induction coils can also be used without the pancake coils in the welding of the edge faces of a tube.

Figures 19, 20, 21, 22, 23:
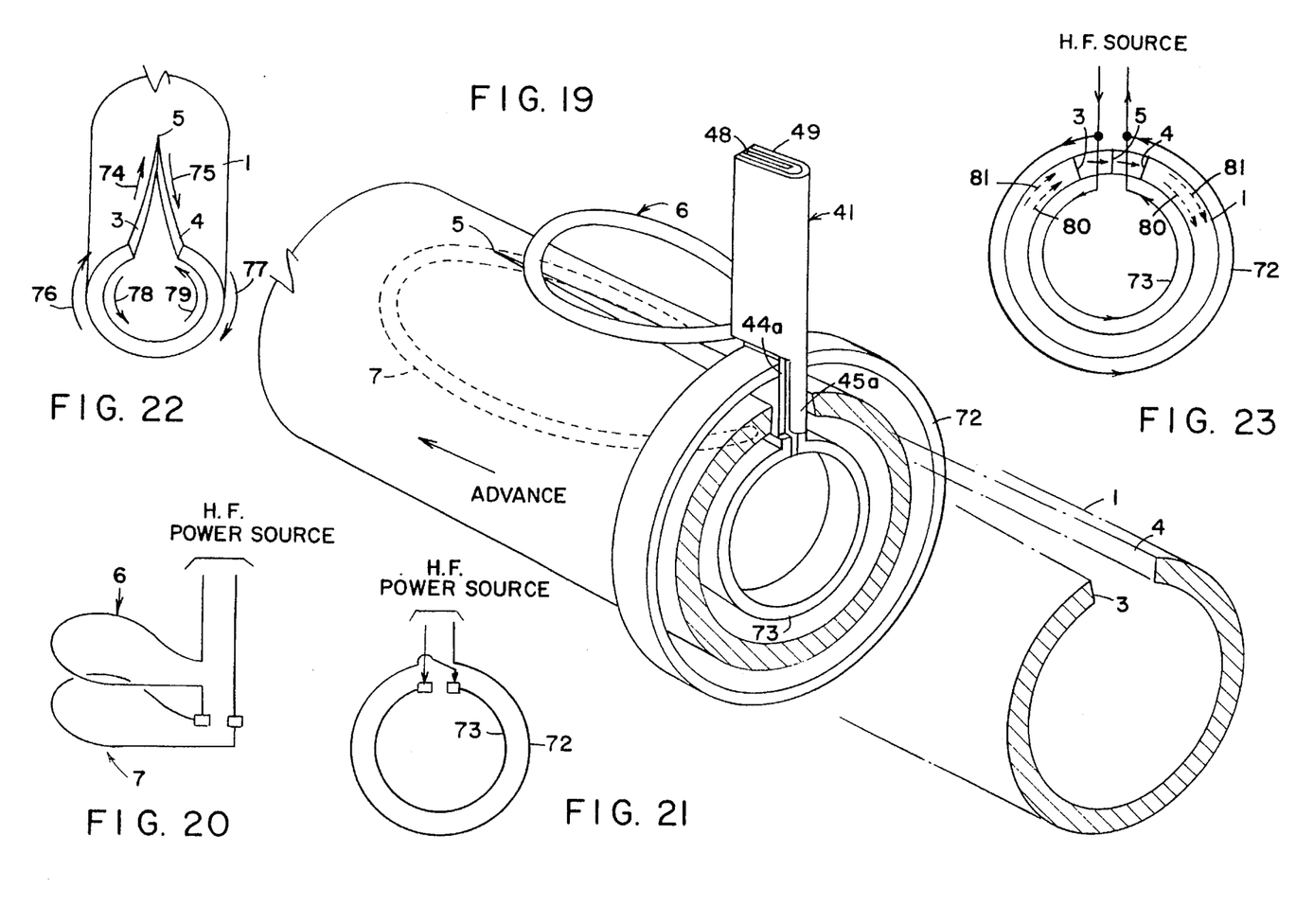
FIG. 19 is a schematic, perspective view illustrating the use of both pancake coils and coils which encircle the axis of a tube, the edge faces of which are to be welded together.
FIG. 20 illustrates schematically electrical series connection of pancake coils.
FIG. 21 illustrates schematically electrical series connection of axis encircling coils.
FIG. 22 is a schematic, perspective figure illustrating current flows.

FIG. 19 illustrates schematically the welding together of the edge faces 3 and 4 of a tube 1 using both the pancake coils 6 and 7 described in connection with FIGS. 1 and 8–10 and a pair of outer and inner induction coils 72 and 73, the outer coil 72 encircling the tube 1 and being in close proximity to the outer surface and periphery of the tube 1 and the inner coil 73 encircling the longitudinal axis of the tube 1 and being in close proximity to the inner surface and inner periphery of the tube 1. Such coils 72 and 73 will sometimes be identified as tube periphery coils to distinguish them from pancake coils.

The pancake coils 6 and 7 are connected to the leads 41 as previously described and act in the manner previously described to induce heating currents in the edge faces 3 and 4. However, if desired, such coils 6 and 7 can be omitted.

Tube periphery coil 72 is conductively connected at its ends to the conductive leads 48 and 49 and tube periphery coil 72 is conductively connected at its ends to the leads 48 and 49 by the contacts 44a and 45a. The coil 73 is supported by a mandrel, such as the mandrel 43 (not shown in FIG. 19) in any conventional manner which does not produce a short-circuit between portions of the coil 73. For example, the mandrel can be encircled by a ring of electrical insulation on which the coil 73 is mounted. It will be observed that all the coils 6, 7, 72 and 73 are connected electrically in parallel.

The coils 72 and 73 will produce electrical currents at the edge faces 3 and 4 which, at any given time, flow in the same direction as the electrical currents produced on the edge faces 3 and 4 by the coils 6 and 7. Thus, the currents add on the edge faces 3 and 4. FIG. 23 indicates schematically the current flows in the coils 72 and 73 at any given time and in the tube 1 by the arrows and arrowheads.

FIG. 24 illustrates the electrical current flows produced in the tube 1 at any given time by pancake coils 6 and 7 by the arrows, circles and plus signs and the relative heating caused by such current flows by the shaded areas. Again, it will be observed that the currents produced by the two coils 6 and 7 add at the edge faces 3 and 4.

As pointed out earlier in this description of the invention, it would be expected by those skilled in the art that if two coils, an inner and outer coil, were used to produce the heating of the faces to be welded together, rather than a single coil, the total amount of power required with two coils would be the same as the amount of power required with a single coil. As discovered from the experiments conducted and reported hereinbefore, this is not the case, and instead, a smaller amount of power is required which leads to a higher electrical efficiency.

While not intending to be bound by a theory as to why there is improved electrical efficiency with two induction coils, it is believed that the improved efficiency is obtained as a result of the fact that there are two separate return paths for the current flowing at the edge faces or portions to be heated to welding temperature. As pointed out hereinbefore, the current induced by induction coils in a part to be heated must flow in a continuous, or closed, path. The portion of the path that follows the edge faces or portions is useful, since it heats such edge faces or portions to welding temperature, but the remaining portion or portions of the path are substantially wasteful of electrical energy since they are spaced from the edge faces or portions to be heated.

FIG. 22 illustrates schematically the current flows when a single induction coil which surrounds the tube axis, either internally or externally of the tube 1, induces the heating current in the tube 1. Thus, all of the induced current flows along the edge faces 3 and 4 in opposite directions as indicated by the arrows 74 and 75. However, due to proximity effect, which causes the most of the return path current to be as close as possible to the induction coil, the return current path will be restricted essentially to either the outside or inside of the tube depending upon whether an external or internal induction coil is used. For example, if only an external coil, e.g. 72 (see FIG. 23), is used, most of the return current will flow at the external surface of the tube 1 along the paths and in the directions indicated by the arrows 76 and 77 in FIG. 22. However, due to the fact that there is a potential difference between the edge faces 3 and 4, a small portion of the return current will flow at the internal surface of the tube 1 as indicated by the arrows 78 and 79.

Assume that the desired current at the edge faces 3 and 4 is 1000 amperes and that an external induction coil 72 used and for purposes of illustration, it is reasonable to assume that the resistances of the return paths externally and internally of the tube 1 are substantially equal, e.g. on the order of 0.1 ohm. The heating power at the edge faces would be $I^2 Re$ watts where Re is the resistance of the edge faces and which is on the order of 0.1 ohm. The wasted return path power is then, $I_{is} R_{is} + I_{os} R_{os}$ where $I_{is}$ is the internal surface current, $I_{os}$ is the external surface current, $R_{is}$ is the internal surface resistance of the tube 1 and $R_{os}$ is the external surface resistance of the tube 1. Because of the proximity effect, most of the return current will flow at the outer surface of the tube 1 with an external induction coil. From experience, it has been found that for illustration purposes, it can be assumed that in such case 900 amperes of current would flow at the external surface and 100 amperes of current would flow at the internal surface. Therefore, the wasted power would be $900^2 R_{os} + 100^2 R_{is}$. With $R_{os} = R_{is}$, the value is 820,000 ($R_{os}$ or $R_{is}$) watts. With $R_{is}$ and $R_{os}$ approximately equal to Re and approximately 0.1 ohm, the useful power is 100,000 watts and the wasted power is 82,000 watts or 82% (82,000/100,000) of the useful power.

Similar analysis applies when only an internal induction coil 73 (see FIG. 23) is used, and the conclusions are similar.

However, when FIG. 22 is compared with FIG. 23, it will be seen that with an internal coil 73 and an external coil 72

(FIG. 23), the return currents follow two different paths, indicated by the arrows 80 and 81 which are radially separated both by reason of the proximity effects of the coils 72 and 73 and by reason of skin effect with high frequencies. Because there are two induction coils 72 and 73, the return currents, which, in total, equal the current at the edge faces can be more nearly equal on the internal and external surfaces of the tube 1 as has been found from experiment, and can be adjusted by adjusting the electrical energy supplied to the coils 72 and 73. Thus, the return current portions of the edge face current are divided between the internal and external surfaces of the tube 1 so that the effective resistance of the return paths is one-half. Assume, for example, that the outside and inside return currents are respectively 600 amperes and 400 amperes and the resistances Re, $R_{is}$ and $R_{os}$ are as assumed to be 0.1 ohm, the wasted power is $600^2 R_{os}+400^2 R_{is}=520,000$ ($RP_{is}$ or $R_{os}$) or 52,000 watts which is only 63% of the wasted power when a single induction coil, 72 or 73 is used. In other words, there is a substantial reduction in electrical power required to perform the desired welding, i.e. 152,000 watts with internal and external induction coils vs. 182,000 watts with only an internal or an external induction coil.

A similar analysis applies when pancake coils 6 and 7 are used. FIG. 24 illustrates by the shaded areas the current paths when two pancake coils 6 and 7 are used. Thus, the shaded areas 82 and 83 indicate the useful current flow on the edge faces 3 and 4, the shaded areas 84 and 85 indicate the return current flow for the current induced by the coil 6 and the shaded areas 86 and 87 indicate the return current flow for the current induced by the coil 7. Again, due to the fact that the current at the edge faces 3 and 4 follows two different return paths, paths 84 and 85 for the current induced by the coil 6 and paths 86 and 87 for the current induced by the coil 7, there is a significant reduction in wasted power and increase in electrical efficiency.

A further possible reason for the increase in electrical efficiency is suggested by a comparison of FIGS. 22 and 23 from which it will be noted that with a single induction coil 72 outside the tube (FIG. 22), there are return currents 78 and 79 on the inner surface of the tube 1 as well as return currents 76 and 77 on the outer surface of the tube 1. Thus, when a single induction coil, either around the tube or a single pancake coil, there are return currents on the surface of the tube 1 nearest the inducing coil and on the opposite surface of the tube 1, the latter return currents being due to the potential difference between the edge faces 3 and 4. When a second induction coil is used, e.g. the coil 73 (FIG. 23), the return current caused by one coil at the surface nearest the second coil is opposed by the current in the latter surface caused by the second coil or "bucked out".

As previously pointed out, most of the return current follows a path as close as possible to the induction coil. From the foregoing analyses, it also will be apparent that the wasted power can be reduced if the resistance of the return paths is reduced. By increasing the width of the inducing coil adjacent the return current paths, the return current spreads out over a wider area and not only lowers the peak temperature of the metal traversed by the return current but also reduces the resistance of the return current paths.

One method of increasing the width of the inducing coil is shown in FIG. 15, and other embodiments will be described in connection with FIGS. 25–29.

Figure 25:
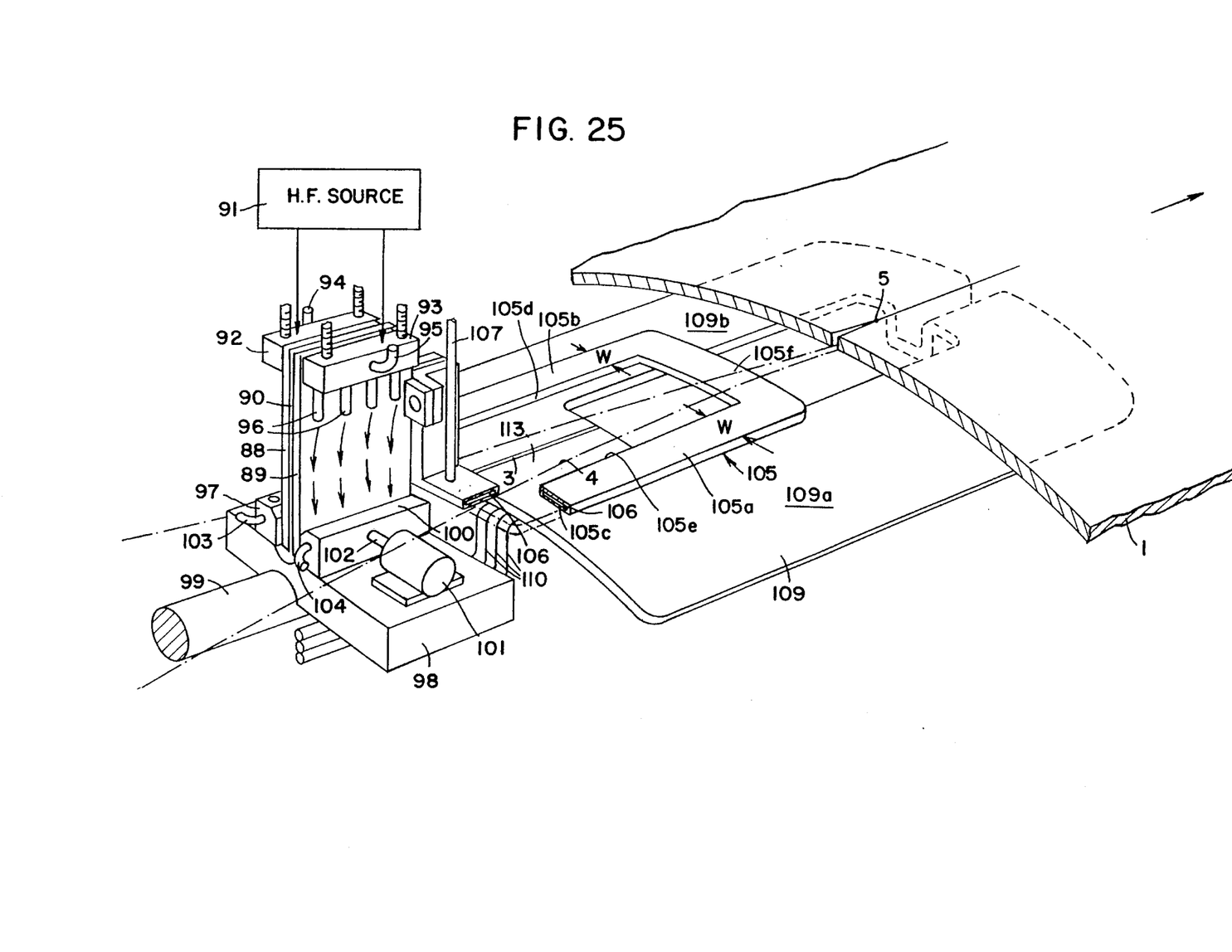
FIGS. 25 and 26 are, respectively, schematic perspective and side elevation views, partly in cross-section, of a further embodiment of the invention.
Figure 26:
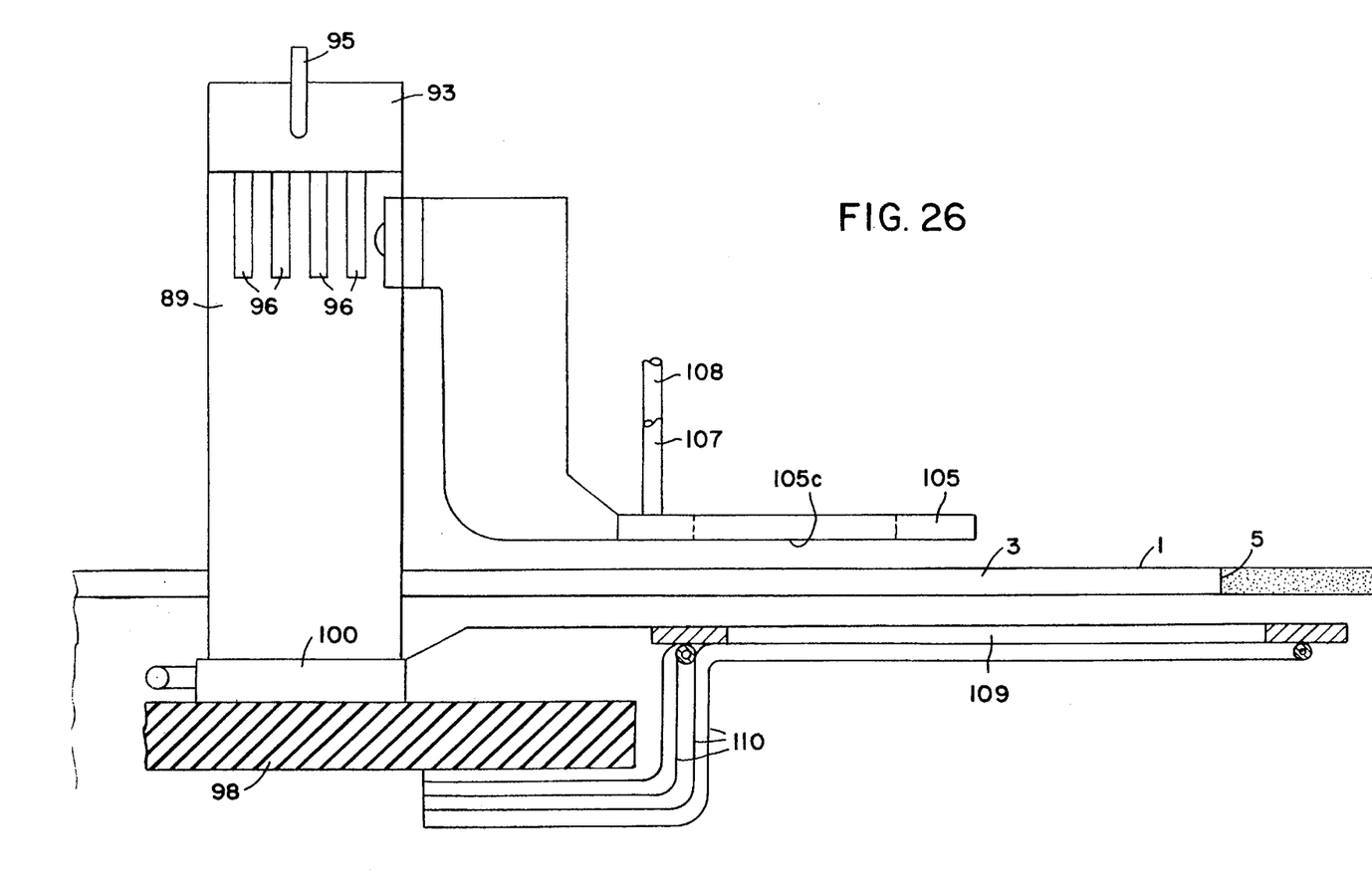

One practical embodiment of the invention is illustrated in FIGS. 25 and 26 and uses the principles described in connection with FIGS. 8 and 9. In FIG. 25, a pair of leads 88 and 89, such as copper plates, separated by insulation 90, such as a sheet of TEFLON, are connected to a high frequency electrical power source 91 in a conventional manner and by way of a pair of blocks 92 and 93 having cooling water channels and conductively secured to the leads 88 and 89, such as by brazing. Cooling fluid, such as water, is supplied to the blocks 92 and 93 by way of tubes 94 and 95, and flows out of the blocks 92 and 93 and onto the external surfaces of the leads 88 and 89 through tubes 96, both blocks 92 and 93 having tubes 96 but only the tubes 96 for the box 93 being visible in the drawings.

A first contact 97, such as a copper block with cooling water channels, is fixedly mounted on a block 98 of insulation, and the insulating block 98 is secured to and supported by a conventional mandrel 99.

A second contact 100, such as a copper block with cooling water channels, is slidably mounted on the insulating block 98 so that it can move toward and away from the lead 89. The second contact 100 can be urged toward the lead 89 by a spring or can be moved toward and away from the lead 89 by gas operated piston and cylinder assembly 101 secured in a fixed position on the insulating block 98 and having a piston rod 102 secured to the contact 100. Such contact arrangement permits movement of the leads 88 and 89 upwardly from the positions shown in FIGS. 25 and 26 for threading purposes described hereinbefore.

Cooling fluid, such as water, is supplied to the contacts 97 and 100 through tubes 103 and 104.

An outer pancake coil 105 is mechanically and electrically conductively secured, at opposite ends, to the leads 88 and 89. Accordingly, when the leads 88 and 89 are moved upwardly, the coil 105 is also moved upwardly, away from the path of the tube 1. The coil 105 has a rectangular cross-section, as distinguished from the circular cross-section of the coils previously described, to increase the volume, and hence, to reduce the resistance, of the return current paths. Thus, the dimension of the legs 105a and 105b in the peripheral direction of the tube 1 is large relative to the dimension of the legs 105a and 105b transverse to such direction. The coil 105 is tubular to provide a cooling fluid circulation duct or channel 106 to which cooling fluid is supplied and removed through the tubes 107 and 108.

The inside pancake coil 109 is connected at its opposite ends respectively to the contact blocks 97 and 100 so that it is electrically in parallel with the pancake coil 105. Although the coil 109 could have a dimension in the direction of the periphery of the tube 1 the same as coil 105 and could be tubular like the coil 105 so as to provide a water cooling channel therein, the legs 109a and 109b can be much wider in the peripheral direction of the tube 1 than the legs 105a and 105b of the coil 105 to reduce the resistance of the return current paths. Instead of being tubular like the coil 105, the coil 109 can have a plurality of fluid, e.g. water, circulating tubes 110 conductively attached to the side thereof remote from the tube 1, such as by brazing.

Figure 27:
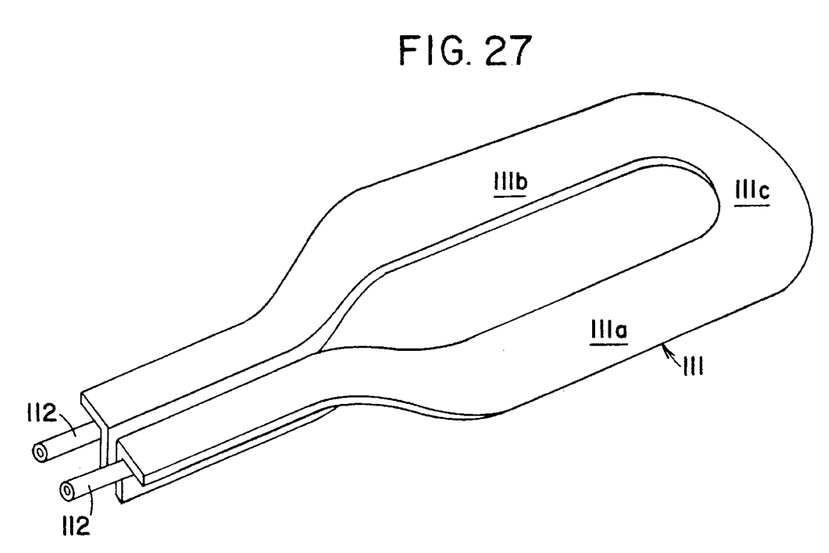
FIGS. 27 and 28 are, respectively, schematic perspective and side elevation views of a pancake coil which can be used with the invention.
Figure 28:
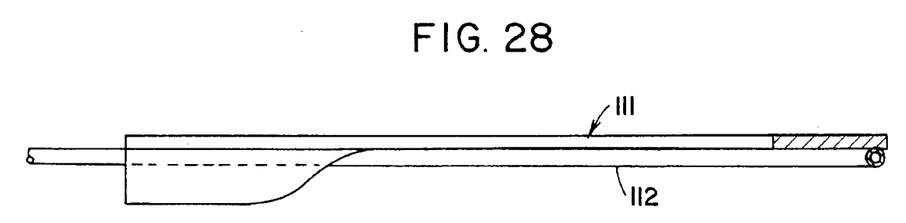

FIGS. 27 and 28 illustrate alternative configurations for the pancake coils 105 and 109. Thus, the coil 111 has legs 111a and 111b which are relatively wide in the direction of the periphery of the tube 1 and is cooled by a tube 112 conductively secured thereto and through which a cooling fluid, such as water is circulated. The nose 111e can have the same width dimension as the legs 111a and 111b or can have a different width dimension.

What is important in increasing the electrical efficiency of the welding operation for both a single induction coil or two induction coils is that the portions of the induction coils which overlie the return current paths be wide enough to substantially increase the width of the return current paths, and hence, reduce the resistance of such paths. This applies both to pancake coils and induction coils encircling the axis of the tube. In the case of pancake coils, all of the return currents underlie the coil. In the case of encircling induction coils, the return currents underlie only the portions of the coils which are not adjacent the edge faces 3 and 4 to be heated to welding temperature.

Accordingly, the portions of the coils overlying the return current paths should have a width, in the direction of the tube periphery for a pancake coil and in the direction of the tube axis for an encircling coil, which, substantially increases the width, and hence, the volume of the return current path and its resistance, as compared to induction coils having a circular cross-section.

Thus, it is known in the art that the current induced in a metal part by an induction coil is the largest where the coil, or portion thereof, is nearest the metal part. When the coil is circular in cross-section, the maximum current flows where the circumference or periphery of the coil is nearest the metal part and tapers off as the circumference increases in spacing with respect to the metal part. Therefore, to distribute the current flow over a wider path in the metal, and hence, decrease the resistance and power loss due to the return current, i.e. the current in paths other than along the surfaces of the parts where they are to be welded together, the portions of the coil adjacent the return current paths should have relatively wide surfaces facing and equidistant from the metal.

For example, the legs 105a and 105b in FIG. 25 have a width w in the direction of the periphery of the tube 1, and hence, transverse to the direction of advance of the tube 1, and radially inward surfaces, such as the surface 105c, facing the tube 1 which are substantially equidistant from the outer surface of the tube 1. The legs 105a and 105b are generally parallel to the edge faces 3 and 4 which have a gap 113 therebetween prior to the weld point 5. The spacing between the edge faces 3 and 4 where they first underlie the upstream of the coil 105 can be in the range from seven-eighths to one-and-one-quarter inches. Depending upon the thickness of the metal of the tube 109, which can, for example, be in the range from about 0.125 inches to about 0.625 inches, the length of the gap 113 from the upstream end of the coil 105 can be in the range from about two inches to eight inches, thicker metals requiring a longer length to obtain the desired heating of the edge faces, for example, to 2500° F. for steel which is above the Curie point for steel. The reference depth for steel at 100 kHz is about 0.08 inches and at 400 kHz is about 0.04 inches with a temperature about 1400° F.

As pointed out in said U.S. Pat. No. 4,197,441, the inner sides 105d and 105e of the legs 105a and 105b should be spaced respectively from the edge faces 3 and 4 by at least ten times the reference depth. Thus, at the upstream end of the coil 105 the spacing between the sides 105d and 105e would be at least seven-eighths inches plus ten times the reference depth. Of course, the coil 105 need not be rectangular as shown in FIG. 25, i.e. have equal spacing throughout their lengths in the direction of advance, and can be closer together at their downstream ends and can, for example, have the sides 105d and 105e parallel to the edge faces 3 and 4. To obtain a significant increase in efficiency by reason of the width of the legs 105a and 105b, the width w of the surfaces of the legs, e.g. 105c, nearest the tube 109, should be at least twice the spacing of the sides 105d and 105e from the edge faces 3 and 4. The following Table I will further illustrate the relationships:

TABLE I

| Heating Power Frequency | Reference Depth 2500° F. | Spacing of sides 105d and 105e from faces 3 and 4 | Width of leg surface nearest tube 109 |
| --- | --- | --- | --- |
| 100 KHz | 0.08 in. | min 0.8 | min 1.6 in. |
| 400 KHz | 0.04 in. | min 0.4 | min 0.8 in. |

Preferably, the spacing of the sides 105d and 105e from, respectively, the edge faces 3 and 4 does not exceed about 30 times the reference depth, and the width w of the surfaces of the legs 105a and 105b does not exceed about 6 times such spacing because larger spacing and widths produce an insubstantial improvement in electrical efficiency and increase the cost of the coil and the difficulties in mounting the coil. The maximum width also depends on the width and thickness of the metal at each side of the gap 11, e.g. the diameter of the tube 109 and the thickness of the tube metal. In general, the width should be about one to three inches, a greater width being used when the when the metal is thick, e.g. 0.625 inches and a narrower width being used when the metal is thin, e.g. 0.125 inches.

The nose portion 105f of the coil 105 can have the same dimension in the direction of advance of the tube 109 as the width dimension of the legs 105a and 105b or can have a different dimension, i.e. larger or smaller.

Similar considerations apply to an induction coil encircling the tube 109 or within the tube 109 and encircling its axis (FIG. 23). Thus, such a coil would have a width, in the direction of advance of the tube 109, for the surface thereof facing the tube 109 which is at least twenty times the reference depth.

An induction coil designed as taught hereinbefore will increase the electrical efficiency of induction welding even when only one induction coil is used, i.e. when a second induction coil at the opposite surfaces of the metal parts as in the invention described hereinbefore is omitted. When two induction coils are employed, e.g. one outside a tube and one inside a tube, it is preferred that both coils have the characteristics described.

Figure 29:
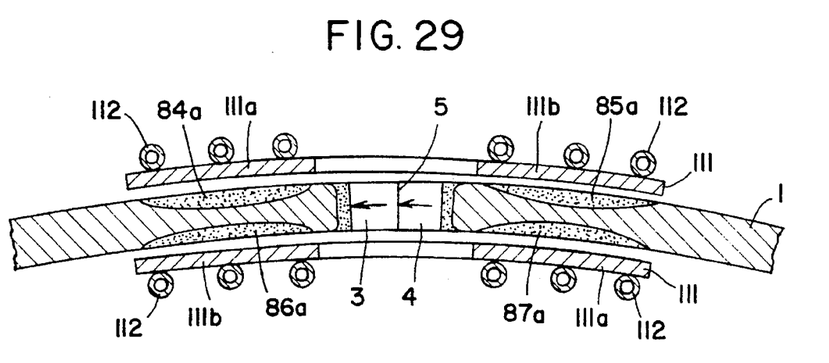
FIG. 29 is an end cross-sectional view illustrating the current paths in a metal tube when a pair of pancake coils of the type shown in FIGS. 25–28 are used to induce currents in the tube.

FIG. 29 illustrates schematically the major current paths in the metal tube 1 when induction coils, such as the coil 111 with wide legs 111a and 111b, are used to induce currents in the tube 1. When FIG. 29 is compared with FIG. 24, the latter showing the major current paths when induction coils of circular cross-section are used, it will be observed that the major current paths at the faces 3 and 4 along which the useful heating currents flow are essentially the same with both types of coils. However, the return and essentially non-useful current paths 84–87 in FIG. 24 are relatively narrow and hence, of relatively high resistance whereas with the wide leg coils 111 (FIG. 29) the return current paths are relatively wide and hence, of lower resistance. Accordingly, with wide leg coils 111, the wasted electrical energy is less than it is with coils with narrow legs.

It will also be observed from FIG. 29 that the surfaces of each of the legs 111a and 111b nearest the tube 1 lie in planes which are substantially parallel to the tube surfaces and each such surface has a substantially constant spacing with respect to the adjacent tube surface. However, while preferred, it is not necessary that the spacings of each such surface with respect to the adjacent tube surface be equal.

Although in the preceding embodiments, the various induction coils have been shown connected to the power source electrically in parallel, the coils 6 and 7 can be connected electrically in series as shown in FIG. 20 in a manner obvious to those skilled in the art, and the coils 72 and 73 can be connected electrically in series as shown in FIG. 21 in a manner obvious to those skilled in the art.

Although single turn pancake coils and single turn tube periphery coils have been illustrated and described, any one or more of the coils can have multiple turns.

Although preferred embodiments of the present invention have been described and illustrated, it will be apparent to those skilled in the art that various modifications may be made without departing from the principles of the invention.

I claim:

1. In a method of electrically welding together a pair of edge portions of a metal part or parts having oppositely facing surfaces in which said edge portions have edge surfaces and are advanced toward a weld point with said edge surfaces in facing and spaced apart relation in advance of the weld point but which are brought together at said weld point, said edge surfaces being heated to welding temperature by the time they reach said weld point by high frequency electrical currents induced in the metal of said part or parts and flowing, at any given time, in one direction on one of said edge surfaces and in the opposite direction on the other of said edge surfaces, the improvement comprising:

inducing a pair of said high frequency currents by at least two induction coils, one said coil disposed at one side of said metal part or parts and another said coil disposed at the other side of said metal part or parts and the one of said pair of currents induced by said one of said coils flowing in the same direction as the other of said pair of currents induced by said another coil on each of said edge surfaces.

2. A method as set forth in claim 1 wherein each of said pair of currents flows in a closed path, each path having a first portion traversing said edge surfaces and said weld point and a second portion spaced from said edge surfaces.

3. A method as set forth in claim 2 wherein at least part of said second portion is spaced in the direction perpendicularly to said edge surfaces.

4. A method as set forth in claim 2 wherein said metal part or parts is a strip of metal being formed into a tube having an axis, said edge portions being at opposite edges of said strip and forming a V in advance of said weld point with the apex of said V being at said weld point and wherein at least part of said second portion of said path is spaced from said edge portions of said V circumferentially of said axis of said tube.

5. A method as set forth in claim 2 wherein said metal part or parts is a strip of metal being formed into a tube having an axis, said edge surfaces being at opposite edges of said strip and forming a V in advance of said weld point with the apex of said V being at said weld point and wherein at least part of said second portion of said path extends circumferentially of said axis of said tube.

6. The method of electrically welding together a pair of edge surfaces of a metal part or parts having oppositely facing surfaces, said edge surfaces having edge surfaces and being advanced toward and said edge surfaces meeting at a weld point and being spaced apart and facing each other in advance of said weld point, said method comprising:

inducing a first high frequency heating current in the metal of said part or parts in advance of said weld point with a first induction coil disposed at one side of said metal part or parts, said current flowing in a closed path traversing the surface of said metal part or parts nearest said first induction coil and traversing said edge surfaces in advance of said weld point and said weld point, the current on one of said edge surfaces flowing in the opposite direction with respect to the current on the other of said edge surfaces at any given time;

inducing a second high frequency heating current in the metal of the part or parts with a second induction coil disposed at the other side of the metal part or parts, said current flowing in a closed path traversing the surface of said metal parts or parts nearest said second induction coil and traversing said edge surfaces in advance of said weld point and said weld point, the second current on one of said edge surfaces induced by said second induction coil flowing in the opposite direction with respect to the second current on the other of said edge surfaces but the second current and the first current on an edge surface flowing in the same direction at any given time; and maintaining said first current and said second current on said edge surfaces in advance of said weld point in a magnitude and for a time sufficient to heat the edge surfaces of the metal part or parts to welding temperature at said weld point.

7. A method as set forth in claim 6 wherein at least one of said first induction coil and said second induction coil is a pancake coil.

8. A method as set forth in claim 7 wherein both said first induction coil and said second induction coil are pancake coils.

9. A method as set forth in claim 6 wherein said metal part or parts is a strip of metal being formed into a tube having an axis and wherein at least one of said first induction coil and said second induction coil is a pancake coil.

10. A method as set forth in claim 9 wherein both said first induction coil and said second induction coil are pancake coils.

11. A method as set forth in claim 6 wherein said metal part or parts is a metal strip being formed into a tube having an axis and wherein at least one of said first induction coil and said second induction coil encircles said axis of said tube.

12. A method as set forth in claim 11 wherein both said first induction coil and said second induction coil encircle said tube axis.

13. Apparatus for welding together a pair of edge portions of a metal part or parts having oppositely facing surfaces, said apparatus comprising:

advancing means for advancing said edge portions with surfaces thereof in spaced, facing relation to provide opposed spaced surfaces and then, into engagement at a weld point;

a first induction coil adjacent one of said oppositely facing surfaces of said metal part or parts and in advance of said weld point for inducing a first, high frequency, electrical, heating current in said one of said oppositely facing surfaces in advance of said weld point, which flows in a closed path which traverses said one of said oppositely facing surfaces nearest said coil, said opposed surfaces of said edge surfaces and said weld point and which flows on one of said opposed surfaces of said edge surfaces in the opposite direction with respect to the current on the other of said opposed surfaces at any given time;

a second induction coil adjacent the other of said oppositely facing surfaces of said metal part or parts and in advance of said weld point for inducing a second high frequency, electrical, heating current in said other of said oppositely facing surfaces, in advance of said weld point, which flows in a closed path which traverses said other of said oppositely facing surfaces nearest said second coil, said opposed surfaces of said edge surfaces and said weld point and which flows on one of said opposed surfaces of said edge surfaces in the opposite direction with respect to the current on the other of said opposed surfaces but the second current and the first current on an opposed surface flowing in the same direction at any given time; and an electrical power source having a current frequency of at least 100 KHz coupled to both said first induction coil and said second induction coil for supplying current to both said first coil and said second coil and for inducing said first current and said second current in said metal part or parts.

14. Apparatus as set forth in claim 13 wherein said metal part is a strip of metal and said edge surfaces are at opposite edges of said strip and further comprising forming means for forming said strip into a tube at said weld point and having an axis and wherein at least one of said first induction coil and said second induction coil is a pancake coil.

15. Apparatus as set forth in claim 14 wherein both said first induction coil and said second induction coil are pancake coils.

16. Apparatus as set forth in claim 15 wherein said first induction coil and said second induction coil are inductively coupled in advance of said weld point.

17. Apparatus as set forth in claim 13 wherein said metal part or parts is a strip of metal and said edge surfaces are at opposite edges of said strip and further comprising forming means for forming said strip into a tube at said weld point and having an axis and wherein at least one of said first induction coil and said second induction coil encircles said axis of said tube.

18. Apparatus as set forth in claim 17 wherein both said first induction coil and said second induction coil encircle said axis of said tube.

19. Apparatus as set forth in claim 17 wherein said one of said first induction coils has a surface substantially equidistant from said tube of a width in the direction of said axis of said tube at least twenty times the reference depth of the current in the metal of said tube for at least the peripheral length thereof which is substantially equal to the peripheral dimension of said tube between said oppositely facing surfaces of said edge portions.

20. Apparatus as set forth in claim 13 wherein said first induction coil and said second induction coil are electrically interconnected by separable contacts which permit one of said first induction coil and said second induction coil to be moved away from the other thereof and insertion of said metal part or parts therebetween.

21. Apparatus as set forth in claim 20 further comprising means for providing fluid to said contacts for cleaning said contacts during separation thereof.

22. Apparatus as set forth in claim 13 wherein the portion of at least one of said first induction coil and said second induction nearest the portion of said path which traverses an oppositely facing surface of said metal part or parts has a surface substantially equidistant from the last-mentioned oppositely facing surface and of a width transverse to said portion of said path of at least 20 times the reference depth of said current in the metal of said metal part or parts.

23. Apparatus as set forth in claim 22 wherein at least one of said first induction coil and said second induction coil is a pancake coil having legs extending parallel to the portion of said path on an oppositely facing surface of said metal part or parts, each of said legs being spaced, respectively, from an oppositely facing surface of an edge portion by at least ten times the reference depth of said current in the metal of said metal part or parts and said legs having surfaces substantially equidistant from the last-mentioned said oppositely facing surface and of a width transverse to said portion of said path at least equal to twice the spacing between said legs and an oppositely facing surface.

24. Electrical induction welding apparatus in which spaced facing surfaces of edge surfaces of a metal part or parts are brought together at a weld point as the edge portions are advanced toward the weld point and are heated by high frequency electrical currents induced in said edge surfaces in advance of the weld point so that said facing surfaces of said edge surfaces reach welding temperature at the weld point, an induction coil connected to a source of high frequency current and having a first minor portion adjacent to said weld point and a second major portion in advance of said weld, said second major portion being positioned with respect to said edge portions to cause edge portion heating current to flow in opposite directions at said spaced facing surfaces of said edge portions in advance of said weld point and to cause said current to flow in a return current path in said metal part or parts in advance of said weld point, spaced from said facing surfaces and adjacent to said second portion of said induction coil nearest thereto, said second portion of said induction coil having a surface substantially equidistant from said metal part or parts of a width in the direction transverse to said return current path which is at least twenty times the reference depth of said current in said metal part or parts.

25. Electrical induction welding apparatus as set forth in claim 24 wherein said width does not exceed sixty times said reference depths.

26. Electrical induction welding apparatus as set forth in claim 24 wherein said metal part or parts is a metal strip formed into a tube having an axis, said strip having edge surfaces at the edges thereof which face each other as said edge surfaces are advanced and said edge surfaces forming a V in advance of the weld point with the apex of the V at the weld point.

27. Electrical induction welding apparatus as set forth in claim 26 wherein said induction coil is a pancake coil adjacent said tube and has legs at peripheral sides of and spaced from said edge surfaces and in advance of said weld point, said legs having leg surfaces facing said tube and equidistant from said tube with the peripherally closest edges of each of said leg surfaces spaced from said facing surfaces of said edge portions by at least ten times said reference depth and having a width peripherally of said tube of at least twenty times said reference depth.

28. Electrical induction welding apparatus as set forth in claim 26 wherein said induction coil encircles said axis and has a surface facing said tube which is substantially equidistant from said tube and which has a width in the direction of said axis of said tube at least twenty times said reference depth for at least the peripheral length thereof which is at least substantially equal to the peripheral dimension of said tube between said edge surfaces of said edge portions.

\* \* \* \* \*

UNITED STATES PATENT AND TRADEMARK OFFICE
CERTIFICATE OF CORRECTION

PATENT NO. : 5,571,437
DATED : November 5, 1996
INVENTOR(S) : Rudd

It is certified that error appears in the above-indentified patent and that said Letters Patent is hereby corrected as shown below:

Col. 15, line 42, change "portions" to --surfaces--;

Col. 15, line 46, change "portions" to --surfaces--.

Signed and Sealed this

Twenty-first Day of January, 1997

Attest:

BRUCE LEHMAN

*Attesting Officer*  *Commissioner of Patents and Trademarks*